April 9, 1940.  H. V. REED  2,196,475

FRICTION CLUTCH

Filed Aug. 26, 1937

Inventor:
Harold V. Reed.
By:- Edward C. Gritzbaugh
Atty.

Patented Apr. 9, 1940

2,196,475

UNITED STATES PATENT OFFICE 2,196,475

FRICTION CLUTCH

Harold V. Reed, Chicago, Ill., assignor to Borg-Warner Corporation, Chicago, Ill., a corporation of Illinois Application August 26, 1937, Serial No. 161,048

12 Claims. (Cl. 192—105)

This invention relates to friction clutches, and particularly to the semi-centrifugal type of friction clutch.

The fully manually operated clutches are designed in such a manner that they are normally held in operative position by a set of coil springs, and are released by a lever system which must overcome the force of the springs. It is customary to design the springs to exert a great deal more force than is actually necessary to prevent slip at low torque conditions and to leave a comfortable margin of capacity at high torque conditions. In average operation, the clutch is usually engaged under low or moderate torque. The automobile operator may, however, engage the clutch at full engine torque which necessitates that total load on the pressure plate be always sufficient to hold full torque at any engine speed.

It has been proposed to reduce the amount of work incident to releasing the clutch by designing the springs to exert the minimum force necessary to prevent slip under low torque conditions, and to supply the additional force for high speed conditions by suitable speed responsive means. Such a design is disclosed in U. S. Patent No. 2,021,973, to Ernest E. Wemp, and comprises weights on the operating levers which tend to augment the spring tension as the speed increases.

This invention is in the nature of an improvement over previous semi-centrifugal friction clutches, and its principal object is to provide a semi-centrifugal clutch which uses a minimum number of special parts.

Another object of this invention is a semi-centrifugal clutch the speed responsive portion of which is made of a minimum number of parts and is substantially frictionless in its operation.

These and other objects of this invention will become apparent from the following detailed description when taken together with the accompanying drawing which forms a part thereof and in which.

Figures 1, 2, 3:
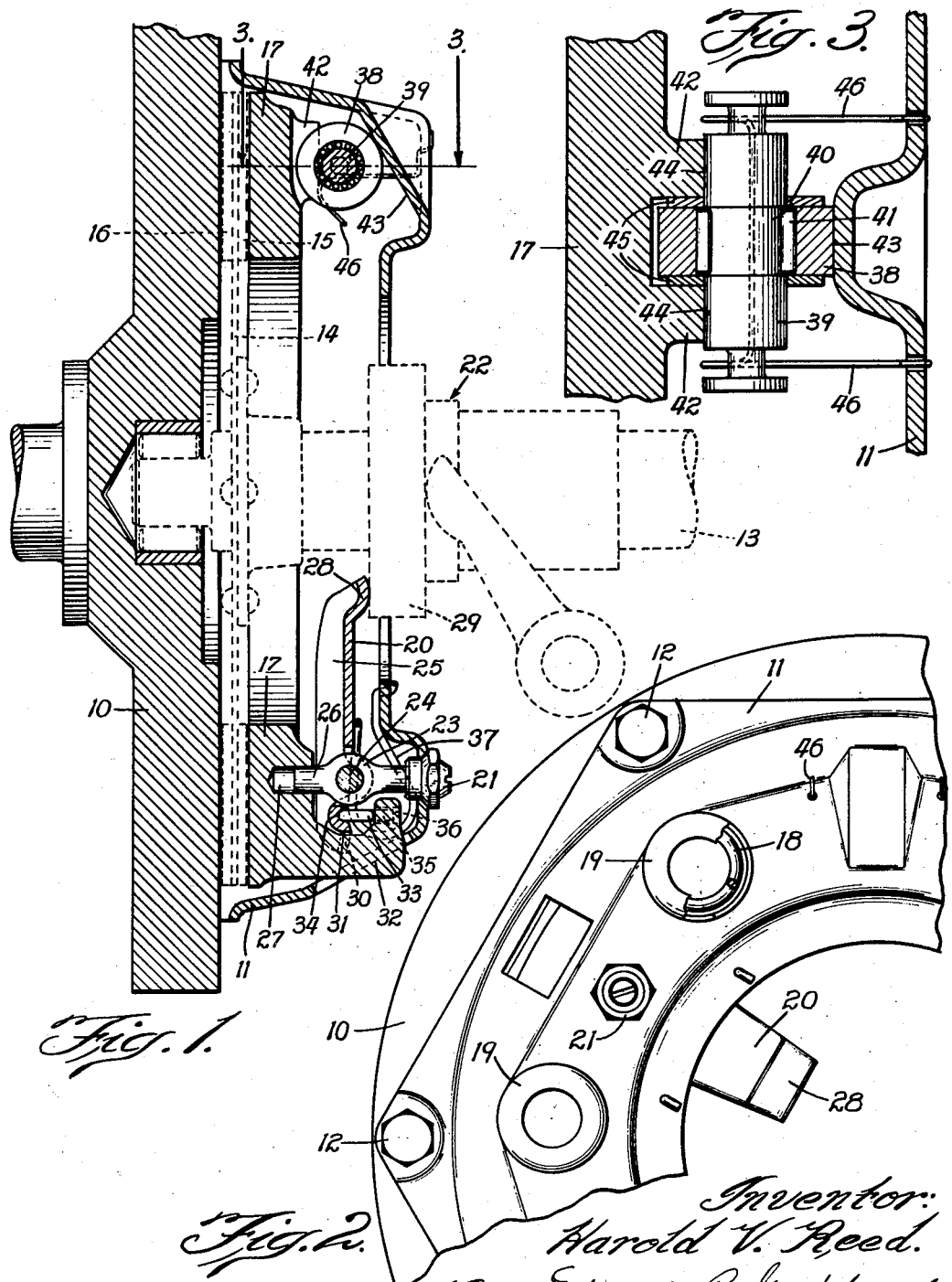
Fig. 1 is a side elevation in section through a clutch embodying the operating means of this invention.
Fig. 2 is a fragmentary front elevation of the clutch of Fig. 1.
Fig. 3 is a section taken through the speed controlled operating means along line 3—3 of Fig. 1.

In its preferred form, this invention comprises a pressure plate, a clutch cover and alternate speed controlled and manually controlled operating means spaced circumferentially about the pressure plate and included between the pressure plate and clutch cover. The manually controlled operating means may be any standard means such as that shown in the aforementioned Wemp patent. The speed controlled operating means is unique and comprises a camming surface on the pressure plate, a camming surface pressed into the clutch cover and a pair of concentric cylinders, one adapted to cooperate solely with the pressure plate camming surface and the other adapted to cooperate solely with the clutch cover camming surface. A needle bearing is used between the concentric rollers to reduce friction therebetween, and a rat-trap type of spring is used to maintain the rollers in place and to eliminate rattle.

Referring now to the drawing, 10 is a fly wheel to which a pressed steel clutch cover 11 is secured by means of bolts 12. Piloted in fly wheel 10 is a driven shaft 13 on which is splined a clutch disc 14 having friction facings 15 and 16. Clutch disc 14 is adapted to be moved axially against fly wheel 10 by means of a pressure plate 17, which is urged against said fly wheel by a series of helical springs 18.

In the form of clutch shown, springs 18 are made lighter than the standard springs, and are made just sufficiently heavy to obtain full engagement of the clutch without slip. Clutch cover 11, however, is provided with spring seats 19 which are of standard size and shape so as to be adapted to receive equally well springs of standard size.

The release mechanism may be any standard type, the one shown, for example, being identical with the one disclosed in U. S. Patent No. 2,062,101 to H. Nutt et al., dated November 24, 1936, and comprises clutch levers 20 which are pivotally mounted on eye bolts 21 supported in cover 11, and are adapted to be operated by a clutch release mechanism designated generally by the reference character 22.

Each eye bolt 21 has an enlarged opening or eye 23 forming a bearing for a transverse floating pin 24, which forms a pivot pin for the lever and is retained in place in said opening by flanges 25 on the lever. The inner end 26 of eye bolt 21 engages an opening 27 in pressure plate 17 to maintain the eye bolt in proper position, and to prevent lateral movement of the clutch lever. One end 28 of clutch lever 20 engages a collar 29 on clutch release mechanism 22 and the other end 30 is recessed at 31 to receive a boss 32 on pressure plate 17. This outer end of the clutch lever cooperates with the boss on the pressure plate to move the pressure plate against the tension of springs 18 and release the clutch disc from clamping engagement between the pressure ring and the fly wheel and, to avoid a rubbing action between the lever and the boss and reduce friction, a strut 33 is interposed between these parts. Strut 33 engages a curved socket 34 in the lever and is recessed to form guides 35 which engage grooves 36 in boss 32. Spring 37 engages cover 11 and the clutch levers to prevent said levers from rattling or chattering, and they also cooperate with springs 18 to hold the clutch levers against the pivot pins and the pivot pins against their bearings in the eye bolts.

Spaced alternately with levers 20 about pressure plate 17 is the speed responsive means shown in detail in the upper portion of Fig. 1 and in Fig. 3. Said speed responsive means comprises weights in the form of concentric rollers 38 and 39. Roller 39 has a central portion 40 of reduced diameter which forms a journal for needle bearings 41. Roller 38 is apertured to fit over needle bearings 41 and is, therefore, free to rotate relative to roller 39. Pressure plate 17 is provided with spaced abutments 42, and clutch cover 11 has a sloping camming surface 43 pressed thereon. The outer surfaces 44 of abutments 42 are adapted to engage roller 39, and camming surface 43 is adapted to be engaged by roller 38. Washers 45 on either side of roller 38 serve to space said roller from abutments 42. A rat-trap type spring 46 bears against grooves 47 in roller 39, and serves to wedge the rollers between abutments 42 and camming surface 43 at all times to prevent said rollers from falling out when the fly wheel is at rest, and to prevent rattling. Springs 46, however, do not exert enough pressure upon the rollers to actuate the clutch.

The operation of the clutch is as follows:

Pressure plate 17 is made to bear against clutch disc 14 initially by means of springs 18, which, as stated above, are of sufficient strength to cause full engagement of the clutch at low torque and speed conditions. As the speed of the clutch increases, the centrifugal force acting upon rollers 38 and 39 increases as the square of the speed, and the rollers will therefore tend to move radially outward. Such radial movement, however, is translated in part into an axial movement by camming surface 43 acting upon roller 38, and hence a part of the centrifugal force is utilized to increase the pressure on pressure plate 17. The force of springs 18 is therefore considerably augmented by the axial component of the centrifugal force acting on the rollers, and this component is active only under high speed conditions, i. e., conditions under which the release of the clutch is very rarely desired.

Due to the rolling action between the rollers and abutments 42 and camming surface 43, and the needle bearing between the rollers, friction is reduced to a negligible amount. Almost all of the centrifugal force is therefore available to operate the speed responsive actuating means. The reduced friction also makes it more readily possible to release the clutch, even under relatively high speed conditions, since the angle of camming surface 43 is such that the rollers can be forced radially inward without jamming between the camming surface and abutments 42.

Although abutments 42 are shown with surfaces 44 substantially at right angles to the axis of the clutch, it is understood that said surfaces function primarily as camming surfaces and can be inclined at any desired angle with the clutch axis.

If it is desired to operate the clutch solely as a standard personally controlled clutch, rollers 38 and 39, washers 45 and spring 46 are omitted and the standard helical springs are substituted for springs 18. If the same clutch is to be semi-speed responsive, the rollers, washers and springs 46 are added and lighter springs 18 are used. This construction, therefore, provides a maximum of flexibility with a minimum of special parts.

It is understood that the foregoing description is merely illustrative of a preferred embodiment of this invention, and that the scope of the invention accordingly is not to be limited thereto, but is to be determined by the appended claims.

I claim:

1. Speed responsive actuating means for clutches and the like comprising an axially fixed member having a camming surface, an axially movable member having a camming surface spaced from said axially fixed member camming surface, and coaxial rollers mounted between said surfaces and adapted to move radially under the influence of centrifugal force to impart motion to the axially movable member, one of said rollers being longer than the other and having a central bearing surface on which said other roller is mounted and having annular grooves at its ends, and resilient means coacting with the annular grooves to maintain said rollers and camming surfaces in engaged position.

2. In a clutch comprising a fly wheel, a clutch cover mounted on said fly wheel, a pressure plate within the cover and rotatable therewith and a drivable disc between the fly wheel and pressure plate, circumferentially spaced springs for urging said pressure plate against the fly wheel to engage the clutch, bosses on said cover adapted to receive said springs, manually operable release mechanism for counteracting said spring tension to release said clutch, and speed responsive means effective at higher speeds to augment said springs, said speed responsive means comprising a roller having a central portion of reduced diameter, a larger roller adapted to be threaded over said first mentioned roller, needle bearings in said recess between said rollers for permitting substantially frictionless relative rotation therebetween, abutments on said pressure plate and including said larger roller therebetween, said abutments having camming surfaces for engaging said first mentioned roller, a camming surface on said cover and adapted to be engaged by said larger roller, and spring means for maintaining said rollers in engagement with their respective camming surfaces, said speed responsive means being removable from the clutch to render said clutch fully spring operable.

3. Speed responsive actuating means for a friction clutch having a drivable disc mounted between a fly wheel and a pressure plate, and a cover secured to the fly wheel, said actuating means comprising a camming surface on the pressure plate, an opposed camming surface on the cover, coaxial rollers mounted between said surfaces and adapted to move radially under the influence of centrifugal force, one of said rollers being journalled upon the other so that such radial movement results in a pure rolling action between the rollers and camming surfaces, and spring means engaging at least one of said rollers and said cover and arranged yieldingly to urge said rollers in unit assembly radially outwardly to maintain said rollers in constant engagement with their cooperating camming surfaces.

4. Speed responsive actuating means for clutches and the like comprising an axially fixed member having a camming surface, an axially movable member having a camming surface spaced from said axially fixed member camming surface, coaxial rollers mounted between said surfaces and adapted to move radially under the influence of centrifugal force to impart motion to the axially movable member, one of said rollers having a central bearing surface thereon for mounting the other of said coaxial rollers, needle bearings between said rollers, one of said members being formed, adjacent the bearing surface thereof, with means coacting with the roller and needle bearing assembly so as to maintain the bearings and the rollers in assembled relation to each other and to said cam surfaces, each roller cooperating with but one camming surface so that the friction developed between the rollers and the camming surface cooperating therewith is a pure rolling friction, and spring means engaging at least one of said rollers and said cover and arranged yieldingly to urge said rollers in unit assembly radially outwardly to maintain said rollers in constant engagement with their cooperating camming surfaces.

5. Speed responsive actuating means for clutches and the like comprising an axially fixed member having a camming surface, an axially movable member having a camming surface spaced from said axially fixed member camming surface, coaxial rollers mounted between said surfaces and adapted to move radially under the influence of centrifugal force to impart motion to the axially movable member, one of said rollers having a central bearing surface on which the other of said coaxial rollers is mounted, and needle bearings between said rollers, the camming surface of one of said members constituting the extremities of a pair of spaced projections on said member, said projections being arranged to maintain the rollers and said needle bearings in operative relation to each other and to said camming surfaces, each roller cooperating with but one camming surface so that the friction developed between the rollers and the camming surfaces is a purely rolling friction.

6. Speed responsive actuating means for a friction clutch having a drivable disc mounted between a fly wheel and a pressure plate, and a cover secured to the fly wheel, said actuating means comprising a camming surface on the pressure plate and opposed camming surfaces on the cover, coaxial rollers mounted between said surfaces and adapted to move radially under the influence of centrifugal force, one of said rollers being journalled upon the other so that such radial movement results in a pure rolling action between the rollers and camming surfaces, and manually operable means for releasing said clutch against the action of centrifugal force on said speed responsive means.

7. Speed responsive actuating means for a friction clutch having a drivable disc mounted between a fly wheel and a pressure plate, and a cover secured to the fly wheel, said actuating means comprising a camming surface on the pressure plate, an opposed camming surface on the cover, coaxial rollers mounted between said surfaces and adapted to move radially under the influence of centrifugal force, one of said rollers being journalled upon the other so that such radial movement results in a pure rolling action between the rollers and camming surfaces.

8. Speed responsive actuating means for clutches and the like comprising an axially fixed and an axially movable member, one of said members having a camming surface and the other of said members having a pair of spaced camming surfaces, and coaxial rollers mounted between said surfaces and adapted to move radially under the influence of centrifugal force to impart motion to the axially movable member, one of said rollers being longer than the other, having a central bearing surface on which the other roller is mounted, and having projecting integral end portions engaging said spaced bearing surfaces.

9. Speed responsive actuating means for clutches and the like comprising an axially fixed member and an axially movable member, one of said members having a pair of spaced projections terminating in camming surfaces and the other of said members having a single camming surface located opposite the space between said projections, and coaxial rollers mounted between said camming surfaces and adapted to move radially under the influence of centrifugal force to impart motion to the axially movable member, one of said rollers encircling and journalled upon the other of said rollers and engaging said single bearing surface, said other roller having roller portions projecting from either end of said one roller and engaging said spaced bearing surfaces, and retaining means received between said projections and cooperating with said rollers for maintaining the rollers in assembled relation to each other and to said bearing surfaces.

10. Speed responsive actuating means for clutches and the like comprising an axially fixed member and an axially movable member, one of said members having a pair of spaced projections terminating in cam surfaces and the other member having a single cam surface located opposite the space between said projections, coaxial rollers mounted between said surfaces and adapted to move radially under the influence of centrifugal force to impart motion to the axially movable member, one of said rollers being longer than the other, having a central bearing portion on which the other roller is journaled, and having projecting end portions engaged against said spaced cam surfaces, the other roller being engaged against said single cam surface, bearing rollers interposed between said bearing portion and said other roller, and retaining washers arranged in embracing relationship to said other roller and said bearing rollers, and received between said projections, said washers and said rollers cooperating with said projections and with each other to maintain said rollers in assembled relationship to each other and to said bearing surfaces.

11. Speed responsive actuating means for clutches and the like comprising an axially fixed member and an axially movable member, one of said members having a pair of spaced projections terminating in cam surfaces and the other of said members having a single cam surface disposed opposite the space between said projections, a pair of coaxial rollers mounted between said surfaces and adapted to move radially under the influence of centrifugal force to impart motion to the axially movable member, one of said rollers being longer than the other, and having projecting end portions engaged against said spaced bearing surfaces, bearing means in the central region of said one roller on which the other roller is journalled for engagement with said single cam surface, said spaced projections embracing between them a portion of said bearing means and said other roller and thereby maintaining said rollers in assembled relationship to each other and to said bearing surfaces.

12. Speed responsive actuating means for clutches and the like comprising an axially fixed member and an axially movable member, one of said members having a pair of spaced projections terminating in cam surfaces and the other member having a single cam surface located opposite the space between said projections, means mounted between said cam surfaces and adapted to move radially under the influence of centrifugal force to impart movement to the axially movable member, said means comprising a pair of roller elements engaging the cam surfaces of said pair of projections, a journal member connecting said roller elements in axial alignment, said roller elements projecting radially beyond said journal member and thereby defining an annular space, a roller encircling said journal member and engaging said single cam surface, bearing elements interposed between said roller and said journal member, said bearing elements being partially received in said annular space and thereby confined between the projecting portions of said roller elements and projecting radially beyond said roller elements, and retainer members embracing said roller and the projecting regions of said bearing elements and confined between said pair of projections, whereby to retain said roller, roller elements and bearing elements in assembled relation to each other.

HAROLD V. REED.